United States Patent [19]
Gillies et al.

[11] 3,880,100
[45] Apr. 29, 1975

[54] SEED DRILL

[75] Inventors: David Gillies, Lyminge; Robert Anthony Willis, Hythe, both of England

[73] Assignee: Stanhay (Ashford) Limited, Ashford, Kent, England

[22] Filed: May 18, 1973

[21] Appl. No.: 361,415

[30] Foreign Application Priority Data
May 22, 1972 United Kingdom............... 23879/72

[52] U.S. Cl. .................... 111/77; 111/85; 222/371
[51] Int. Cl. ............................................. A01c 5/00
[58] Field of Search ................... 111/85, 77, 71, 33; 221/253, 263, 371; 178/504

[56] References Cited
UNITED STATES PATENTS
1,484,318 2/1924 Barnhart........................ 178/504 X
2,684,781 7/1954 Allen et al. ..................... 222/371 X
2,691,353 10/1954 Secondo ........................... 111/85 X
2,770,400 11/1956 Mattson.......................... 222/371 X
3,122,283 2/1964 Walter ............................... 222/371
3,272,159 9/1966 Sanderson....................... 222/371 X
3,279,658 10/1966 Dinges............................ 222/371 X Primary Examiner—Stephen C. Pellegrino

[57] ABSTRACT

The invention provides a towable seed drilling unit for seeds or pelleted seeds having a coulter and furrow closing means and an endless band with tows of seed-enclosing holes therein, driven from a ground-contacting wheel thereof and arranged to drop seed at regularly spaced intervals into a furrow formed by the coulter.

3 Claims, 2 Drawing Figures

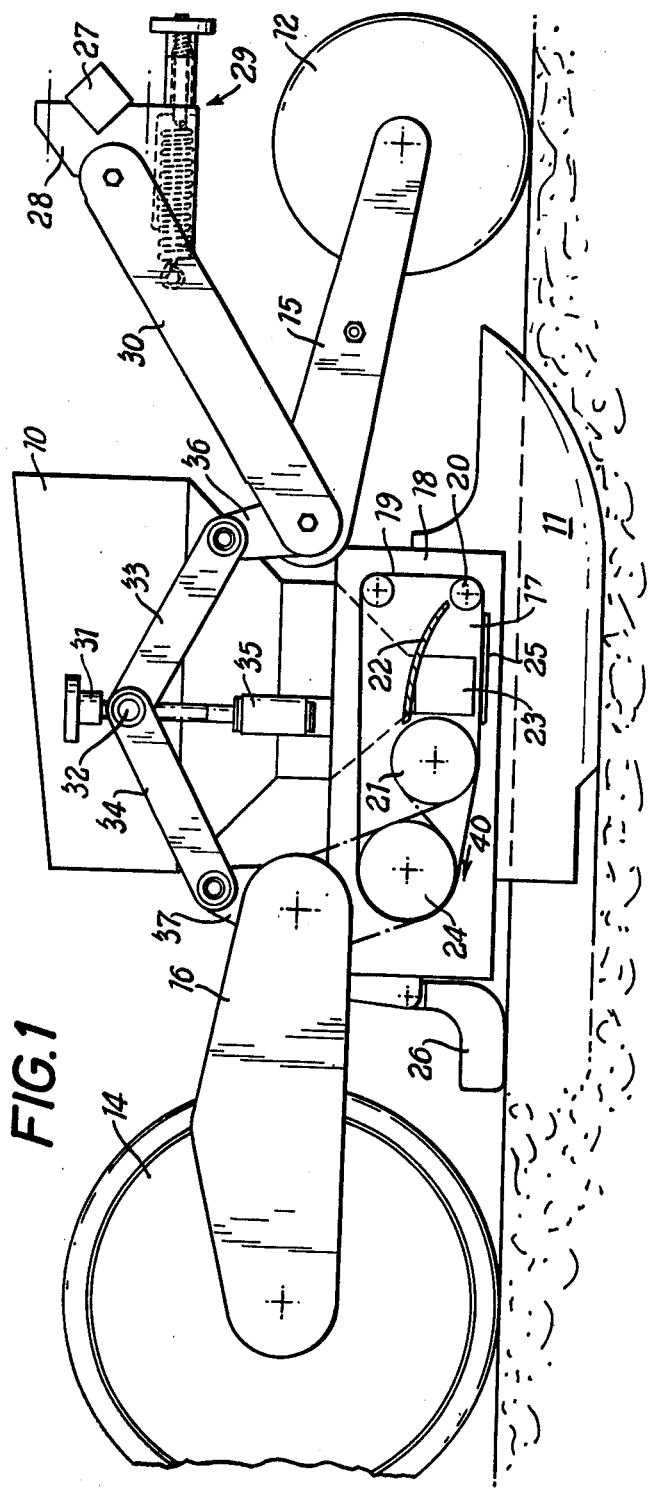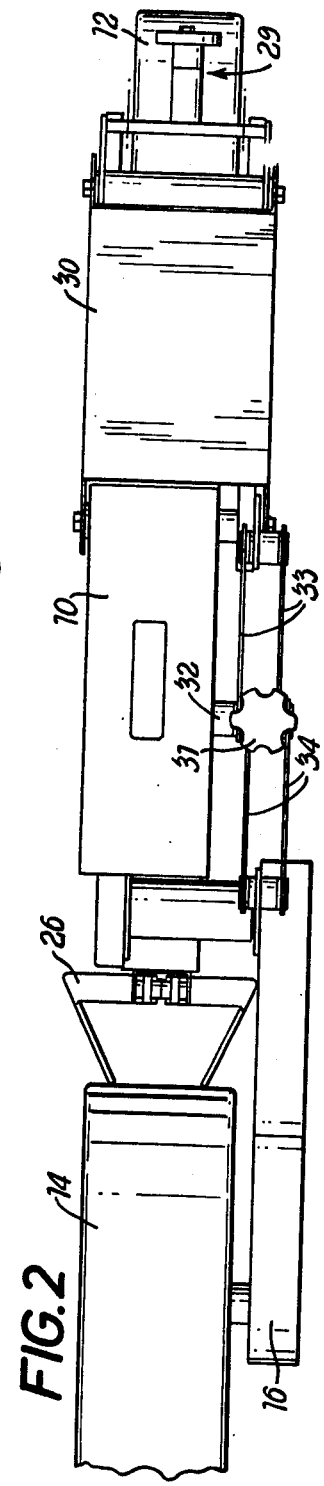

ID:3,880,100

SEED DRILL

SUMMARY OF THE INVENTION

This invention relates to a seed drilling unit, and is particularly suited for sowing seed tablets and encapsulated seeds.

According to the invention, there is provided a towable seed drilling unit comprising in combination a seed hopper, gravity feed means to a seed chamber whose floor is constituted by a proportion of the lower run of an endless belt, regularly spaced holes or transverse rows of holes through the said belt each sized to contain a single seed, a seed-repelling roller for agitating seed in the said chamber, a plate below the said floor masking all but one of the holes or transverse rows of holes therein through which seeds may fall, drive means between a ground-contacting wheel on the rear of the unit and a belt drive roller to drive the said lower run in a direction contrary to the towing direction, a coulter for forming a furrow ahead of a momentarily unmasked row of holes and a furrow closing member mounted behind the said coulter.

Preferably the belt is driven from the rear one of a pair of wheels when the unit is so mounted.

The drive may comprise a variable ratio chain and sprocket system enabling the alteration of seed spacing along a furrow.

Preferably, also, means are provided for adjusting the level of the wheels relative to the remainder of the unit whereby furrow depth may be altered.

Such means may include a manually operable screw and linkage system operable upon pivoted arms carrying the wheels.

Adjustable spring tension means may be provided between a towing bracket of the unit and the arms carrying the unit to adjust ground-contacting pressure.

BRIEF DESCRIPTION OF THE DRAWING

An embodiment of the invention will now be described by way of example only with reference to the accompanying drawings, in which:

FIG. 1 is a side view of a seed drilling unit according to the invention, and

FIG. 2 is a plan view of the unit of FIG. 1.

DETAILED DESCRIPTION OF THE INVENTION

The seed drilling unit illustrated comprises the seed metering device on which is mounted a seed hopper 10 and a coulter 11 of the runner type, which may, if preferred be replaced by a disc type coulter.

The drilling unit is supported by a forward wheel 12 and rear wheel 14, which are carried by pivotal arms 15 and 16 respectively, and which may be fitted with tyres if desired. If preferred, the forward wheel 12 and arms 15 can be removed, and the front of the unit is carried on a parallel linkage device, not shown on the accompanying drawings, which replaces arms 30.

A seed chamber 17 is provided beneath the hopper 10. It is bounded between side walls 18, and a proportion of the length of an endless belt 19 constitutes the floor. A belt supporting roller 20 constitutes the forward wall, a driven seed repelling roller 21 forms the rearward wall and a plate 22 acts as a roof.

Seed enters the chamber 17 from the hopper 10 through a large square aperture 23 in one of the side walls 18.

The arms 16 carrying the rear wheel 14 is constituted by the casing of a variable ratio chain drive (not shown) between the said wheel and belt drive roller 24 and seed-repelling roller 21.

The belt 19 is preferably formed from reinforced rubber and the lower run is driven in the direction indicated by the arrow 40, contrary to the direction in which the unit is towed.

A single or transverse rows of seed-receiving holes (not shown) are made through the belt at regular intervals throughout its length. The holes are just large enough to contain a single seed and to permit it to pass through. There may be up to three holes in each transverse row.

A plate 25 presses upwardly against the belt and masks the bases of holes lying above it, but as the holes pass beyond its rear edge the seed contained in each is free to fall into the furrow formed by the coulter 11.

A furrow closing member 26 is mounted behind the coulter to shift ridged soil back on top of seeds which have dropped into the furrow.

The seed-repelling roller 21 not only acts to prevent more than one seed entering a hole in the belt, but acts to agitate the body of seeds in the chamber 17, thus ensuring a regular feed from the hopper 10.

It will be appreciated that the spacing of seeds along the furrow is dependent upon the longitudinal spacing of holes in the belt 19 as well as upon the chosen ratio of chain drive between wheel 14 and drive roller 24.

The unit is adapted for attachment to the transverse tow bar 27 of a tractor by means of a bracket 28. Several units may be affixed to the bar side-by-side.

The tow bar 27 being fixed to the tractor (not shown) is maintained at a substantially constant height from the the ground, and thus the bracket 28 may constitute the anchorage for means applying a downward pressure to the unit. To this end an adjustable spring tension device 29 is provided in bracket 28 to exert an anticlockwise pull upon arm 30, which is pivoted at its upper end to the bracket and at its lower end to the rear end of arm 15.

A manually operable threaded member 31 is provided to adjust the height of the wheels 12 and 14 relative to the remainder of the unit, and thus to adjust the depth of furrow ploughed by the coulter 11.

The member 31 has a threaded portion engaged with a pivot pin 32 for two inclined links 33 and 34 and an unthreaded portion carrying a collar (not shown) freely rotatable in a bush 35 fixed to one of the side walls 18 of the seed chamber.

The lower end of link 33 is pivoted to a cranked extension 36 of arm 15 and the lower end of link 34 is pivoted to a cranked extension 37 of arm 16.

Rotation of member 31 in one direction draws extensions 36 and 37 towards one another and thus raises wheels 12 and 14, while rotation in the other direction has the opposite effect.

The unit described is capable of sowing seed tablets and encapsulated seeds with accurate spacing and at high speed.

It will be understood that various modifications may be made to the embodiment of the invention above described, such as fall within the scope of the following claims:

We claim:

1. A towable seed drilling unit comprising:
   a seed hopper;

a seed chamber having walls and a floor formed by a portion of the lower run of an endless belt, said endless belt being regularly perforated by at least one row of holes along its length, each hole being sized to contain a single seed;

means communicating with said seed hopper and said seed chamber for providing gravity feed between said seed hopper and said seed chamber;

a seed repelling roller in communication with said endless belt for agitating seed in said seed chamber;

a masking plate located below said floor formed by said endless belt, the rear edge of said plate being forwardly spaced from said seed repelling roller and unmasking at least one hole in said endless belt through which a seed may fall;

means including a drive roller for carrying said endless belt;

a coulter located beneath said seed chamber for forming a furrow ahead of said unmasked hole;

a furrow closing member located behind said seed chamber for closing said furrow formed by said coulter;

a first ground contacting wheel located in front of said coulter;

a second ground contacting wheel located in back of said furrow closing member;

drive means operably associated with said second ground contacting wheel and said drive roller for driving said lower run of said endless belt in a direction opposite the direction in which said towable seed drilling unit is towed; and means including at least one pivot arm attached to said first ground contacting wheel, a linkage system coupled to said at least one pivot arm and a manually adjustable screw operatively associated with said linkage system for adjusting the level of said towable seed drilling unit above the ground.

2. A towable seed drilling unit as defined in claim 1 wherein a towing bracket is provided, an arm has one end coupled to said at least one pivot arm and its other end coupled to said towing bracket and a variable spring tension means is provided between said towing bracket and said arm.

3. A towable seed drilling unit comprising:

a seed hopper;

a seed chamber having walls and a floor formed by a portion of the lower run of an endless belt, said endless belt being regularly perforated by at least one row of holes along its length, each hole being sized to contain a single seed;

means communicating with said seed hopper and said seed chamber for providing gravity feed between said seed hopper and said seed chamber;

a seed repelling roller in communication with said endless belt for agitating seed in said seed chamber;

a masking plate located below said floor formed by said endless belt, the rear edge of said plate being forwardly spaced from said seed repelling roller and unmasking at least one hole in said endless belt through which a seed may fall;

means including a drive roller for carrying said endless belt;

a coulter located beneath said seed chamber for forming a furrow ahead of said unmasked hole;

a furrow closing member located behind said seed chamber for closing said furrow formed by said coulter;

a first ground contacting wheel located in front of said coulter;

a second ground contacting wheel located in back of said furrow closing member;

drive means operably associated with said second ground contacting wheel and said drive roller for driving said lower run of said endless belt in a direction opposite the direction in which said towable seed drilling unit is towed; and means including a manually adjustable screw, a first pivot arm coupled to said first ground contacting wheel, a second pivot arm coupled to said second ground contacting wheel, a first linkage coupled between said first pivot arm and said manually adjustable screw, and a second linkage coupled between said second pivot arm and said manually adjustable screw for adjusting the level of said towable seed drilling unit above the ground.

* * * * *